(12) United States Patent
Nirgudkar

(10) Patent No.: US 11,940,235 B1
(45) Date of Patent: Mar. 26, 2024

(54) SOTERIA: SMART AND SAFE ADD-ON FOR FIREARMS

(71) Applicant: Siddharth Nirgudkar, Acton, MA (US)

(72) Inventor: Siddharth Nirgudkar, Acton, MA (US)

( * ) Notice: Subject to any disclaimer, the term of this patent is extended or adjusted under 35 U.S.C. 154(b) by 0 days.

(21) Appl. No.: 18/123,320

(22) Filed: Mar. 19, 2023

(51) Int. Cl.
| | |
|---|---|
| *F41A 17/06* | (2006.01) |
| *G01P 13/00* | (2006.01) |
| *G01S 19/17* | (2010.01) |
| *H04M 1/72421* | (2021.01) |
| *H04M 1/72436* | (2021.01) |
| *H04M 1/72463* | (2021.01) |
| *H04W 4/021* | (2018.01) |
| *H04W 4/90* | (2018.01) |

(52) U.S. Cl.
CPC ............ *F41A 17/063* (2013.01); *G01P 13/00* (2013.01); *G01S 19/17* (2013.01); *H04M 1/72421* (2021.01); *H04M 1/72436* (2021.01); *H04M 1/72463* (2021.01); *H04W 4/021* (2013.01); *H04W 4/90* (2018.02)

(58) Field of Classification Search
CPC ......... H04M 1/72421; H04M 1/72436; H04M 1/72463; H04W 4/021; H04W 4/90; G01S 19/17; G01P 13/00; F41A 17/063
USPC ...................................................... 455/404.2
See application file for complete search history.

(56) References Cited

U.S. PATENT DOCUMENTS

| | | | | |
|---|---|---|---|---|
| 6,415,542 B1* | 7/2002 | Bates | ...................... | F41A 17/06 |
| | | | | 42/70.11 |
| 8,850,944 B2* | 10/2014 | Zhou | ...................... | F41A 17/063 |
| | | | | 42/70.08 |
| 9,341,425 B2* | 5/2016 | Carlson | ................... | F41A 19/10 |
| 9,546,835 B2* | 1/2017 | Efremkina | .............. | G01S 19/14 |
| 10,264,395 B1* | 4/2019 | Milde, Jr. | ............... | H04W 4/90 |
| 10,883,782 B2* | 1/2021 | Apostolopoulos | ....... | F41A 17/08 |
| 11,032,788 B1* | 6/2021 | Noonan | ................ | H04W 64/00 |
| 11,405,754 B2* | 8/2022 | Obaidi | ................... | H04W 4/029 |
| 2002/0178635 A1* | 12/2002 | Martin | .................... | F41A 17/06 |
| | | | | 42/70.11 |
| 2011/0319051 A1* | 12/2011 | Reitnour | ............... | H04W 4/185 |
| | | | | 342/357.55 |
| 2014/0202058 A1* | 7/2014 | Zhou | ..................... | F41A 17/063 |
| | | | | 42/70.11 |
| 2014/0378088 A1* | 12/2014 | Goel | ..................... | H04W 4/029 |
| | | | | 455/404.2 |

(Continued)

*Primary Examiner* — Joshua E Rodden

(57) ABSTRACT

Centuries back, guns were means of hunting. Today, these guns fall into the hands of mentally unstable people, causing random acts of violence such as school shootings. There is no meaningful legislation from the government, despite shootings like Sandy Hook and Uvalde. The proposed apparatus will alert the responsible parties when a firearm is in the vicinity of schools and then produce a loud broadcast to deter the perpetrator. The apparatus uses a GPS module that can track the geolocation of the firearm concerning sensitive areas such as schools. The apparatus configures a safety zone, which if breached activates the alert mechanism. These early alerts will provide all the information to schools and local law enforcement to take immediate action and prevent the incident. Tracking, detection, early alerts, and deterrence are the key elements of my apparatus. Hopefully, these safety features can also drive improvement in design of new guns.

12 Claims, 2 Drawing Sheets

(56) References Cited

U.S. PATENT DOCUMENTS

| | | | | |
|---|---|---|---|---|
| 2015/0040453 A1* | 2/2015 | Ballard | ................ | F41A 17/063 |
| | | | | 42/70.11 |
| 2015/0077255 A1* | 3/2015 | Pallotta | ................ | F41A 17/063 |
| | | | | 340/572.1 |
| 2016/0025438 A1* | 1/2016 | Alderman | ............... | F41A 19/09 |
| | | | | 42/70.11 |
| 2016/0116241 A1* | 4/2016 | Efremkina | ......... | G08B 21/0261 |
| | | | | 42/1.01 |
| 2017/0268841 A1* | 9/2017 | Austin | ................. | F41A 17/063 |
| 2022/0182786 A1* | 6/2022 | Obaidi | ................. | H04W 4/029 |
| 2022/0390200 A1* | 12/2022 | Faizan | ................ | F41A 17/063 |

* cited by examiner

SOTERIA: SMART AND SAFE ADD-ON FOR FIREARMS

FIELD OF THE INVENTION

The present apparatus relates generally to a smart device with GPS, speakers, alarms, sensors, Raspberry Pi, wifi module, accelerometer and other components that will fit on the gunstock. The apparatus automatically tracks the whereabouts of the firearm on which it is attached, checks if the firearm is in the proximity of a school, alerts the authorities, and ensures the safety of children in the school.

BACKGROUND OF THE INVENTION

The United States without guns is only a utopia. We need to accept that there will always be people who will keep guns. Additionally, most school shootings are caused by big guns, such as the AR-15, and other semi-automatic rifles. These are military weapons and have no place in society, but unfortunately, they exist and create havoc. There have been 71 mass shootings already in the past 2 months in the year 2023, with the latest being at the Michigan State university. This is never-ending. Gun-control laws are practically useless, and the gun lobby is so strong that no meaningful legislative actions can be taken for the foreseeable future.

This is despite that majority of Americans agree on stricter control of firearms and demand safety. No sane individual can inflict mass shootings. As has been proven multiple times, underlying unstable mental health condition is the key driver for such a horrific act. All the more is the fact that many of these shootings are committed by adolescents, whose parents had no idea what was going on. With COVID, we have seen an increase in the number of mental health conditions nationwide. Such uptick in mental health conditions coupled with loose gun laws can wreak havoc in the society. Why can't we use the technical wonders of the 21st century to solve this problem instead of waiting on government officials? Can and should technology not come to the rescue? The present apparatus tries to do the same. It automatically tracks the whereabouts of the gun on which it is installed, checks if the gun is in the proximity of a school, alerts the authorities immediately, thereby preventing a mishap from happening and ensuring the safety of children in the school.

BRIEF SUMMARY OF THE INVENTION

The present apparatus is a device that uses the tenets of Internet of Things (IoT) and has three key features—GPS, Google Map APIs, and automated alerts. The apparatus is meant to be mounted on the gunstock. Responsible gun owners can voluntarily attach the device to their guns to prevent misuse. It then automatically tracks the whereabouts of the gun, checks if the firearm is in the proximity of a school, alerts the authorities, and ensures the safety of children in the school.

DESCRIPTION OF THE PREFERRED EMBODIMENT

Figure 1:
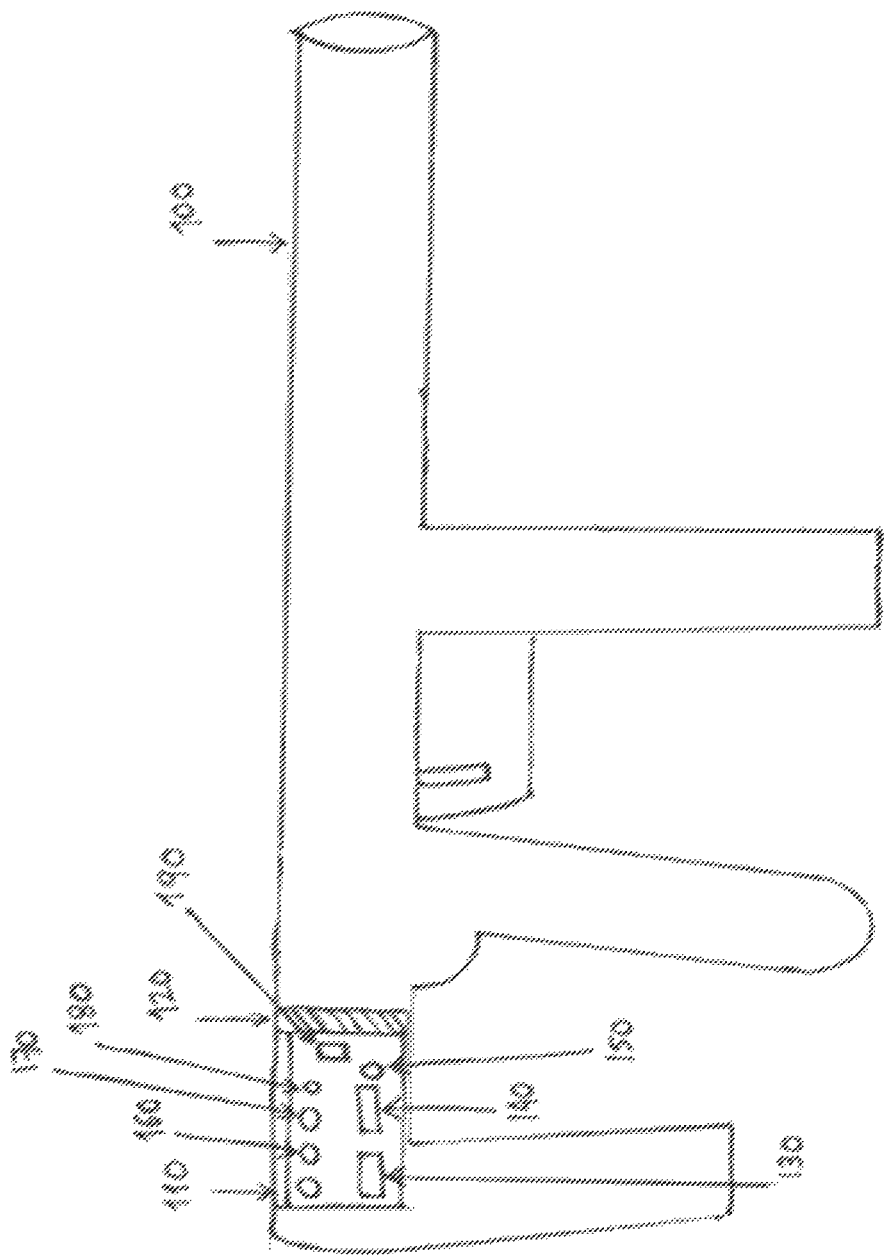
FIG. 1 is the schematic of the apparatus attached to a firearm.
Figure 2:
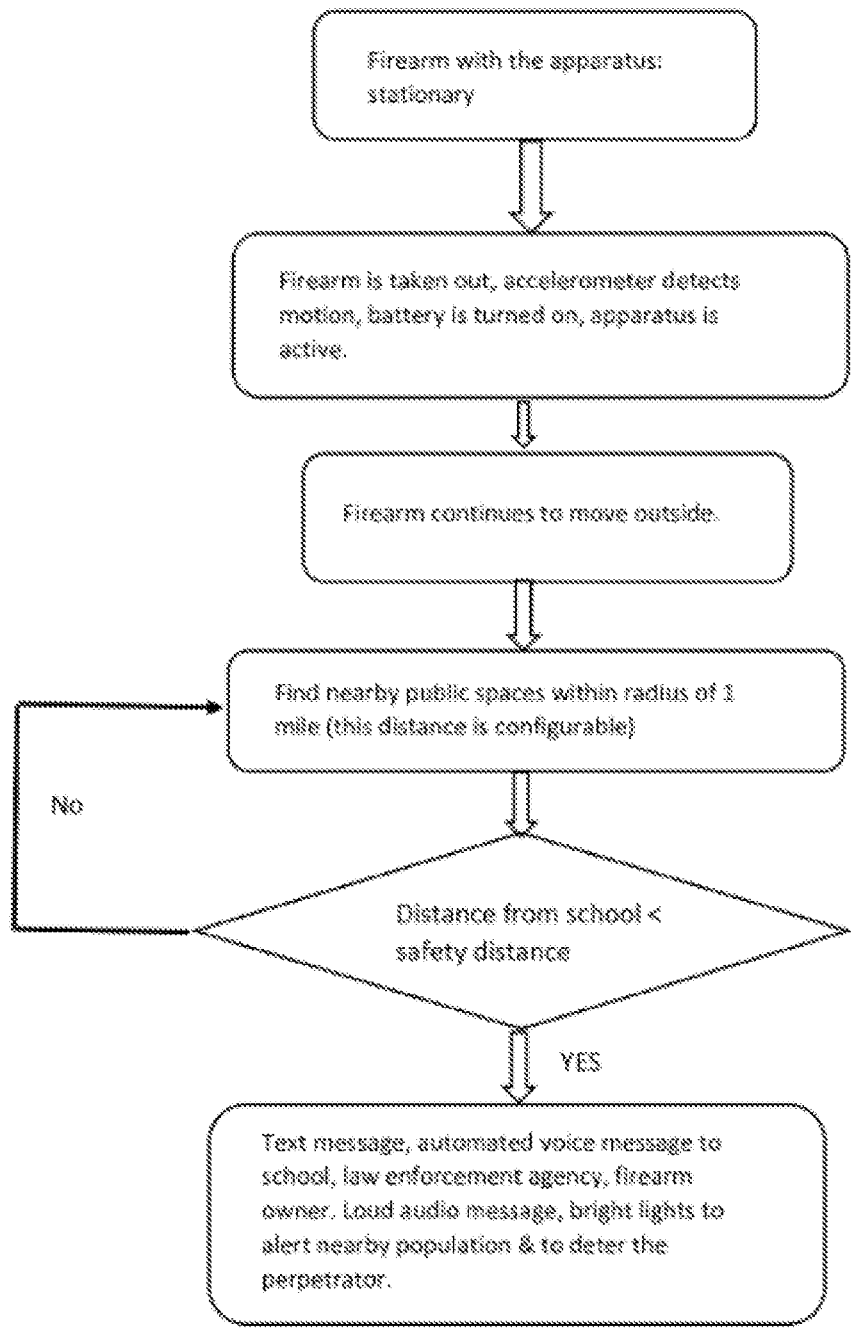
FIG. 2 is the flow diagram of the working of the device.

All illustrations of the drawings are for the purpose of describing selected versions of the present apparatus. FIG. 1 illustrates various components of the apparatus. The preferred embodiment of the device comprises a rectangular case (110) that encompasses a Raspberry Pi module (130), GPS module (140), Force Sensitive Resistor (FSR) (190), wifi or IoT module (150), power source (120), accelerometer (160), light emitting diodes (LEDs)(180) and speaker (170). All of these components work in tandem with each other to track the firearm (100) and create alerts when the firearm (100) is near a school, and avoid violence.

The chassis (110) is designed with a rectangular shape which will be mounted on the gunstock as shown in figure FIG. 1. The position of the apparatus is such that it will not obstruct the regular operation of the firearm (100).

It is very critical that the apparatus is robust and fits securely on the gunstock. FSR is positioned between the apparatus and the gunstock as shown in FIG. 1. The FSR tracks that the apparatus is connected to the firearm and sends an alert to the owner if it is removed.

The chassis (110) in its preferred embodiment of the present apparatus is designed with a flexible material capable of molding to a desired shape. This type of material allows the apparatus to be placed securely and adjust to the shape of the gunstock.

The apparatus comprises of a Raspberry Pi module (130), a power source such as a battery (120), a speaker (170), a GPS module (140), accelerometer (160) and a IoT module (150). The apparatus needs to be ON all the time and therefore choosing the right power source with good longevity is critical. The apparatus may have a smart ON/OFF switch design based on the usage pattern. It is also necessary that the battery cannot be removed to make the apparatus dysfunctional. An alert may be triggered in the event this happens.

Software component within the apparatus query the GPS sensor (140) to get the coordinates of itself (and in turn, the gun on which it is mounted). The microprocessor component (130) then calls the Google Map APIs to acquire distance from the nearby schools and tracks the location of the gun (100). The software has an in-built safety zone limit which is decided based on approximately what the reaction time (of law enforcement and the school) should be. The limit can also be parameterized by having each school select its own based on its local conditions and requesting gun owning parents to adhere to it. This can be part of the school setup on Google so that the information can be retrieved through APIs. The API will also return the contact number of that specific school whose safety zone is being breached. The software broadcasts a text alert (and/or call) which can be sent on the school's contact number and to the law-enforcement agencies via a 911 call.

The apparatus may have an App that may help to configure the contact information of the gun owner. If a gun is located in the vicinity of a school, the software will broadcast alerts to the gun owner as well.

Working of the Preferred Embodiment

The present apparatus in its preferred embodiment is designed as an add-on to an existing firearm. The design of this apparatus can also be introduced while designing new firearms as well such that the apparatus becomes in-built feature of these large guns.

The apparatus once fixed on the gunstock securely will transition to a tracking mode. If there is no movement detected by the sensor (for example, when the firearm is stored securely), the apparatus will be inactive. This can be detected by an accelerometer (160).

If an accelerometer (160) detects motion, then the software within the apparatus will make an API call to understand the location of the nearby schools. Information about the coordinates of the firearm, name of the school, contact number, safety distance (if provided by the school), contact of the nearest law enforcement office will be returned back from the API request.

If the firearm is in motion (as detected by an accelerometer (160)), the apparatus will then compute the coordinates of the gun every 15 seconds and will check if the gun is approaching any of the safety limits set by the nearby schools. If no significant distance change is detected for around 10 cycles (a cycle has 15 seconds), the interval of measurement will increase from 15 seconds to 30 seconds, and so on until the apparatus detects no change, implying the apparatus is not in motion. After certain set time, the cycle may be reset.

High risk scenario will be when the firearm has been picked up and the perpetrator is in motion. In this scenario, the apparatus will continuously track the whereabouts of the firearm, and compare the distance of the firearm with the safety zones set for the schools. Any time the safety zone is crossed, the apparatus will send an alert to the concerned school and the law enforcement authorities informing them about the geocoordinates of the perpetrator, type of the firearm and other details.

If the gun-owner has updated contact information through the App, then the same alert will also be sent to the gun-owner. Upon receiving an alert, the school can immediately take proactive measures like ensuring their doors are locked, and the law-enforcement teams can spring into action and reach the school immediately.

The apparatus will also broadcast a loud message on the speakers (170) with LEDs (180) blinking at highest intensity "YOU ARE TAKING A FIREARM WITHIN SCHOOL LIMITS—LAW ENFORCEMENT HAS BEEN NOTIFIED. BACK OFF IMMEDIATELY". This message will be broadcast continuously in a loop to deter the perpetrator and stop the actions that the perpetrator was planning to take. The broadcast may be in the range of 90-100 decibels. As psychology suggests, an intervention at the right time might help the perpetrator come to sense and may break the thought to cause violence. Furthermore, it would alert the surrounding population so they can assist in stopping the perpetrator.

The apparatus will have an in-built safety zone limit which will be decided based on the approximate reaction time needed in case of an emergency. Factors such as traffic, weather conditions, size of the school amongst others will be used to derive this safety zone limit. Individual schools may also select their own safety zone limits based on their respective conditions. This can be part of the school set up on Google so that this information can be retrieved through the API calls.

As of today, about 20 to 30 million Americans own firearms similar to the AR-15. There is a high probability that some of these live close to school campuses. Based on the zoning laws within each state, the housing may not be less than 500 feet from the school. In case the safety zone of a school falls within this range, then there may be a risk that guns stored in such housing may cause false positives as they are being stored or change locations within the house. The software for the apparatus will have additional intelligence for such specific cases. The program will track the motion of the firearm and also check the direction of motion. If the firearm is moving towards the school, only then will the motion be considered relevant. This will prevent any false alarms and the alerts will be triggered only when there is a real danger.

Although the apparatus has been explained in relation to its preferred embodiment, it is to be understood that minor possible variations may be made without departing from the spirit and scope of the apparatus.

Embodiment of the apparatus may be implemented on various computing systems. For example, a computing system may include one or more computer processors, non-persistent storage (e.g., volatile memory, such as random access memory (RAM), cache memory), persistent storage (e.g., a hard disk, an optical drive such as a compact disk (CD) drive or digital versatile disk (DVD) drive, a flash memory, etc.), a communication interface (e.g., Bluetooth interface, an infrared interface, network interface, optical interface, etc.), and numerous other elements and functionalities.

The computer processor(s) may be an integrated circuit for processing instructions. For example, the computer processor(s) may be one or more cores or micro-cores of a processor. The computing system may also include one or more input devices, such as a touchscreen, microphone, touchpad, electronic pen, or any other type of input device.

The communication interface may include an integrated circuit for connecting the computing system to a network (e.g., a wide area network (WAN) such as the Internet, mobile network, or any other type of network) and/or to another device, such as another computing device.

Software instructions in the form of the computer-readable program code to perform embodiments of the apparatus may be stored, in whole or in part, temporarily or permanently, on a non-transitory computer-readable medium such as a CD, DVD, storage device, a diskette, a tape, flash memory, physical memory, or any other computer-readable storage medium. Specifically, the software instructions may correspond to computer-readable program code that, when executed by a processor(s), is configured to perform one or more embodiments of the apparatus.

What is claimed is:

1. An apparatus for real-time tracking, alerts and preventive measures comprising:
    a microprocessor, an accelerometer, a battery, GPS, IoT connectivity, a FSR, speakers and LEDs;
    wherein the accelerometer, the battery, the speaker, the GPS, the IoT connectivity and the microprocessor are all encased within the apparatus, wherein the FSR is configured to monitor whether the apparatus is attached to a firearm, and wherein the FSR is configured to be located between a gunstock of the firearm and an outside of the apparatus;
    wherein the apparatus is configured to: monitor a location of the apparatus, compare the location of the apparatus with respect to nearby school(s) or other identified public places and check if the apparatus is approaching the school(s) or other identified public places and crossing a safety zone, alert the specific school or other identified public places, an associated law enforcement agency of an approaching perpetrator and a firearm owner using a SOS alert, and alert people nearby by using the speaker, thereby preventing a potential hazardous situation; and
    wherein the apparatus is configured to: alert the firearm owner if the apparatus is removed from the gunstock of the firearm.

2. The apparatus of claim 1, wherein the microprocessor is enabled with the IoT connectivity or wifi or Bluetooth.

3. The apparatus of claim 1, wherein a mobile phone application configuration provides setting for contact information of the firearm owner.

4. The apparatus of claim 1, wherein the battery is turned on only after motion of the firearm is detected with the accelerometer.

5. The apparatus of claim 1, wherein the FSR is configured to track if the apparatus is removed from the firearm, and send an alert to the firearm owner.

6. A method for monitoring a geolocation of an apparatus on a firearm, comprising:
   the apparatus comprising a microprocessor, an accelerometer, a battery, GPS, IoT connectivity, a FSR, speakers and LEDs;
   wherein the accelerometer, the battery, the speaker, the GPS, the IoT connectivity and the microprocessor are all encased within the apparatus, wherein the FSR is configured to monitor whether the apparatus is attached to the firearm, and wherein the FSR is located between a gunstock of the firearm and an outside of the apparatus;
   detecting, using the apparatus, a distance of the apparatus with respect to nearby schools, alerting a firearm owner, one or more of the nearby schools and a nearby law enforcement agency about a potential threat using the IoT connectivity, and broadcasting a message on the speakers of the apparatus to convey the potential threat to a nearby population and to deter a perpetrator.

7. The method of claim 6, wherein the alerting is created only when the firearm has breached a configurable safe zone distance of the nearby school.

8. The method of claim 6, wherein an alert SMS text or call is sent to the one or more nearby schools, the firearm owner and to the nearby law enforcement agency.

9. The method of claim 6, wherein when the message is broadcasted through the speaker, the LED lights are activated to act as a deterrent to the perpetrator and to forewarn the nearby population.

10. The method of claim 6, further comprising preventing false positive alarms when the firearm is moved from one place to another within a house of the firearm owner and poses no threat to any of the nearby schools by detecting a movement as benign.

11. The method of claim 6, further comprising preventing false positive alarms when the firearm is stationary in a house of the firearm owner, but where the house is in close proximity to one of the nearby schools but poses no threat to the one of the nearby schools by detecting a location as one present in a registered white list.

12. The method of claim 6, wherein the apparatus is configured such that an alert distance is configured to be modified, a type of place(s) to be safeguarded is configured to be modified, a participant contact list who will receive the alerts is configured to be modified.

* * * * *